(12) United States Patent
Kambayashi et al.

(10) Patent No.: US 10,833,299 B2
(45) Date of Patent: Nov. 10, 2020

(54) SEALING MEMBER, ENERGY STORAGE DEVICE AND METHOD OF MANUFACTURING ENERGY STORAGE DEVICE

(71) Applicant: GS Yuasa International Ltd., Kyoto (JP)

(72) Inventors: Hirokazu Kambayashi, Kyoto (JP); Kazuto Maeda, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 143 days.

(21) Appl. No.: 15/781,450

(22) PCT Filed: Dec. 28, 2016

(86) PCT No.: PCT/JP2016/089143
§ 371 (c)(1),
(2) Date: Jun. 4, 2018

(87) PCT Pub. No.: WO2017/115856
PCT Pub. Date: Jul. 6, 2017

(65) Prior Publication Data
US 2018/0375069 A1 Dec. 27, 2018

(30) Foreign Application Priority Data
Dec. 28, 2015 (JP) .................. 2015-257525

(51) Int. Cl.
*H01M 2/08* (2006.01)
*H01M 2/06* (2006.01)
(Continued)

(52) U.S. Cl.
CPC .............. *H01M 2/08* (2013.01); *H01G 9/008* (2013.01); *H01G 9/0029* (2013.01); *H01G 9/10* (2013.01);
(Continued)

(58) Field of Classification Search
CPC ............ H01M 2/08; H01M 2/06; H01M 2/02; H01M 2/12
See application file for complete search history.

(56) References Cited

U.S. PATENT DOCUMENTS

2011/0200870 A1 8/2011 Kim et al.

FOREIGN PATENT DOCUMENTS

| JP | 2001-135283 A | 5/2001 |
| JP | 2001135283 A * | 5/2001 |

(Continued)

OTHER PUBLICATIONS

Machine Translation of: JP 2001/135283 A, Nakamura et al., May 18, 2001.*

(Continued)

*Primary Examiner* — Kenneth J Douyette
(74) *Attorney, Agent, or Firm* — McGinn I.P. Law Group, PLLC.

(57) ABSTRACT

A sealing member (positive electrode first sealing member) disposed between a terminal (positive electrode terminal), which is provided on a case of an energy storage device, and the case or between a current collector (positive electrode current collector), which is electrically connected with the terminal, and the case. The sealing member includes a first surface (bottom surface) which faces the case and a second surface (bottom surface) which is opposite to the first surface and faces the terminal or the current collector. A first protrusion is formed on the first surface, the first protrusion surrounding a shaft portion of the terminal. A second protrusion is formed on the second surface, the second protrusion surrounding the shaft portion of the terminal. A protrusion amount of the first protrusion is different from a protrusion amount of the second protrusion.

20 Claims, 8 Drawing Sheets

(51) Int. Cl.
| | |
|---|---|
| *H01M 2/04* | (2006.01) |
| *H01M 2/10* | (2006.01) |
| *H01G 11/80* | (2013.01) |
| *H01G 11/74* | (2013.01) |
| *H01G 11/84* | (2013.01) |
| *H01M 2/30* | (2006.01) |
| *H01G 9/00* | (2006.01) |
| *H01G 9/008* | (2006.01) |
| *H01G 9/10* | (2006.01) |

(52) U.S. Cl.
CPC ............ *H01G 11/74* (2013.01); *H01G 11/80* (2013.01); *H01G 11/84* (2013.01); *H01M 2/0404* (2013.01); *H01M 2/06* (2013.01); *H01M 2/30* (2013.01)

(56) References Cited

FOREIGN PATENT DOCUMENTS

| | | |
|---|---|---|
| JP | 2006-216411 A | 8/2006 |
| JP | 2011-165643 A | 8/2011 |
| JP | 2016-091720 A | 5/2016 |

OTHER PUBLICATIONS

International Search Report (ISR) (PCT Form PCT/ISA/210), in PCT/JP2016/089143, dated Feb. 21, 2017.

\* cited by examiner

SEALING MEMBER, ENERGY STORAGE DEVICE AND METHOD OF MANUFACTURING ENERGY STORAGE DEVICE

TECHNICAL FIELD

The present invention relates to; a sealing member disposed between a terminal, which is provided on a case, and the case or between a current collector, which is electrically connected with the terminal, and the case; an energy storage device which includes the sealing member; and a method of manufacturing the energy storage device.

BACKGROUND ART

In an energy storage device, an electrode assembly is accommodated in a case, and a terminal electrically connected to the electrode assembly is provided on the case in an exposed manner from the case. A sealing member is interposed between the case and the terminal and hence, gas tightness around the terminal is ensured by the sealing member whereby quality of the energy storage device per se is enhanced (see patent document 1, for example).

PRIOR ART DOCUMENT

Patent Document

Patent Document 1; JP-A-2011-165643

SUMMARY OF THE INVENTION

Problems to be Solved by the Invention

In such an energy storage device, there has been a demand for further enhancement of quality of the energy storage device such as ensuring of gas tightness.

Accordingly, it is an object of the present invention to realize the enhancement of quality of an energy storage device.

Means for Solving the Problems

To achieve the object, a sealing member according to an aspect of the present invention is disposed between a terminal, which is provided on a case of an energy storage device, and the case or between a current collector, which is electrically connected with the terminal, and the case, the sealing member including: a first surface which faces the case; and a second surface which is opposite to the first surface and faces the terminal or the current collector, wherein a first protrusion is formed on the first surface, the first protrusion surrounding a shaft portion of the terminal, wherein a second protrusion is formed on the second surface, the second protrusion surrounding the shaft portion of the terminal, and wherein a protrusion amount of the first protrusion is different from a protrusion amount of the second protrusion.

Advantages of the Invention

According to the present invention, quality of the energy storage device can be enhanced.

MODE FOR CARRYING OUT THE INVENTION

Figure 1:
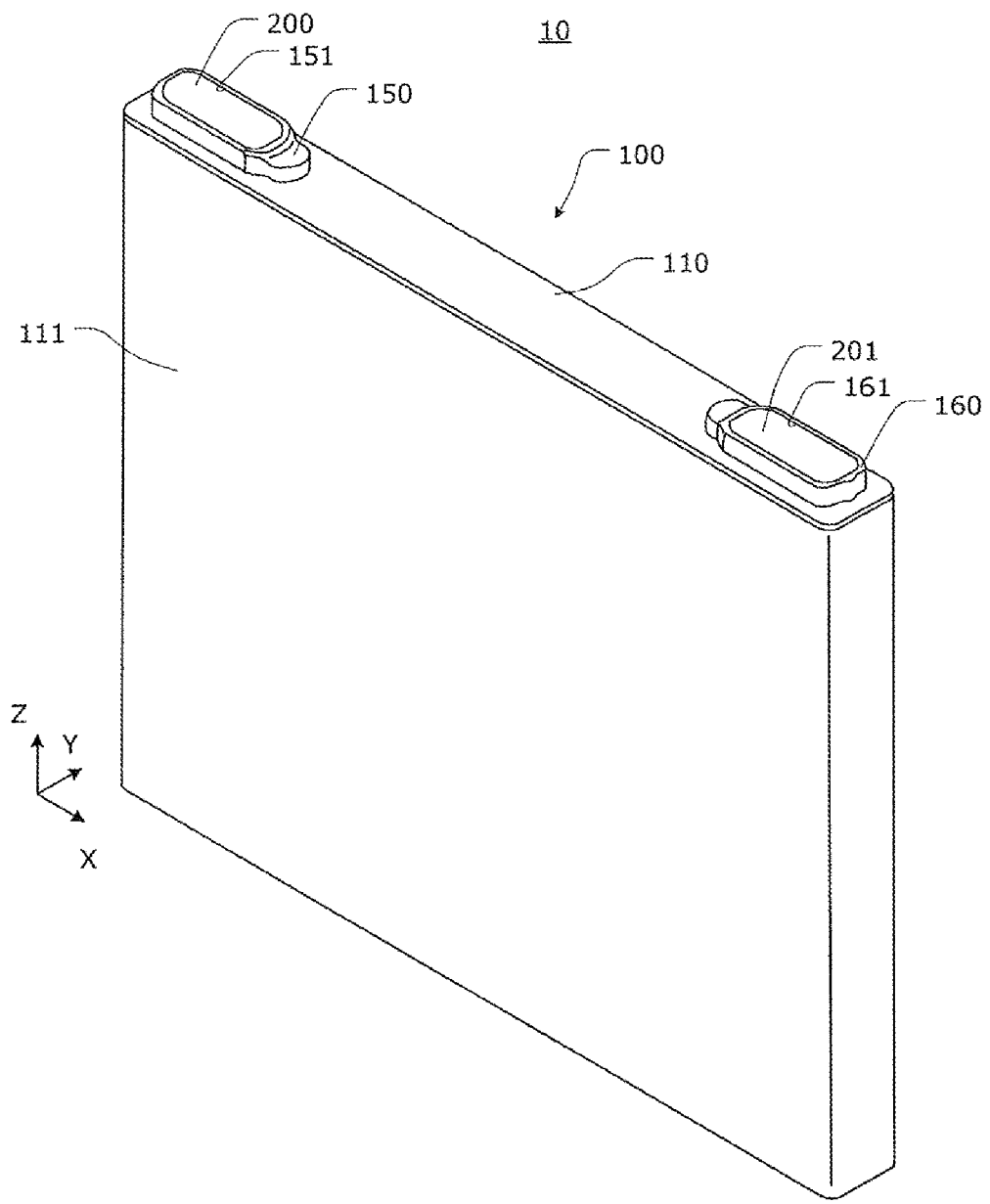
FIG. 1 is a perspective view schematically showing an external appearance of an energy storage device according to a first embodiment.

To achieve the object, a sealing member according to an aspect of the present invention is disposed between a terminal, which is provided on a case of an energy storage device, and the case or between a current collector, which is electrically connected with the terminal, and the case, the sealing member including: a first surface which faces the case; and a second surface which is opposite to the first surface and faces the terminal or the current collector, wherein a first protrusion is formed on the first surface, the first protrusion surrounding a shaft portion of the terminal, wherein a second protrusion is formed on the second surface, the second protrusion surrounding the shaft portion of the terminal, and wherein a protrusion amount of the first protrusion is different from a protrusion amount of the second protrusion.

With such a configuration, the protrusion amount of the first protrusion formed on the first surface of the sealing member and the protrusion amount of the second protrusion formed on the second surface of the sealing member are different from each other and hence, quality of the energy storage device per se can be enhanced compared with a case where the first protrusion and the second protrusion have the same protrusion amount.

The protrusion amount of the first protrusion may be larger than the protrusion amount of the second protrusion.

Since the protrusion amount of the first protrusion is larger than the protrusion amount of the second protrusion and hence, a collapsing margin of the first protrusion can be increased. Accordingly, after the sealing member is compressed, hermetic property between the compressed first protrusion and the case can be increased. Further, the collapsing margin is large and hence, gas tightness can be maintained over a long period.

The first protrusion may comprise a plurality of first protrusions, the plurality of first protrusions surrounding the shaft portion of the terminal co-axially.

The first protrusion includes a plurality of first protrusions, and the plurality of first protrusions surround the shaft portion of the terminal co-axially and hence, gas tightness on a case side can be increased.

Respective protrusion amounts of the first protrusions may be set such that the protrusion amount is larger for the first protrusion which is farther from the shaft portion of the terminal.

The sealing member has a property where when the sealing member is compressed between the terminal and the case or between the current collector and the case, the closer to the shaft portion of the terminal, the larger a compressive force becomes. That is, even when the protrusion amount of the first protrusion is small near the shaft portion of the terminal, the first protrusion can be compressed to an extent that gas tightness can be acquired. In other words, by setting the respective protrusion amounts of the plurality of first protrusions such that the protrusion amount is larger for the first protrusion which is farther from the shaft portion of the terminal, any one of first protrusions can be compressed to an extent that sufficient gas tightness can be acquired.

The second protrusion may comprise a plurality of second protrusions, the plurality of second protrusions surrounding the shaft of the terminal co-axially.

The second protrusion includes a plurality of second protrusions, and the plurality of second protrusions surround the shaft portion of the terminal co-axially and hence, gas tightness on a terminal side or a current collector side can be increased.

Respective protrusion amounts of the second protrusions may be set such that the protrusion amount is larger for the second protrusion which is farther from the shaft portion of the terminal.

The sealing member has a property where when the sealing member is compressed between the terminal and the case or between the current collector and the case, the closer to the shaft portion of the terminal, the larger a compressive force becomes. That is, even when the protrusion amount of the second protrusion is small near the shaft portion of the terminal, the second protrusion can be compressed to an extent that gas tightness can be acquired. In other words, by setting the respective protrusion amounts of the second protrusions such that the protrusion amount is larger for the second protrusion which is farther from the shaft portion of the terminal, any one of second protrusions can be compressed to an extent that sufficient gas tightness can be acquired.

The second protrusion may comprise a plurality of second protrusions, the plurality of second protrusions surrounding the shaft portion co-axially, respective protrusion amounts of the first protrusions in a compressed state may be set such that the protrusion amount is smaller for the first protrusion on which a stress acting is larger, and respective protrusion amounts of the second protrusions in a compressed state may be set such that the protrusion amount is smaller for the second protrusion on which a stress acting is larger.

The plurality of first protrusions and the plurality of second protrusions surround the shaft portion of the terminal co-axially, and hence, gas tightness between the case and a terminal side or between the case and a current collector side can be increased.

The first protrusion may comprise a plurality of first protrusions, the plurality of first protrusions surrounding the shaft portion of the terminal co-axially, the second protrusion may comprise a plurality of second protrusions, the plurality of second protrusions surrounding the shaft portion of the terminal co-axially, and at least one of protrusion amounts of the first protrusions may be larger than at least one of protrusion amounts of the second protrusions.

At least one of protrusion amounts of the plurality of first protrusions is larger than at least one of protrusion amounts of the plurality of second protrusions and hence, a collapsing margin of at least one first protrusion can be increased. Further, the protrusion amount of other first protrusions may be set smaller than the protrusion amount of the second protrusion and hence, the degree of freedom in designing sealing member can be increased.

Further, respective protrusion amounts of the plurality of first protrusions are set such that the protrusion amount is smaller for the first protrusion on which a stress acting is larger, and respective protrusion amounts of the plurality of second protrusions are set such that the protrusion amount is smaller for the second protrusion on which a stress acting is larger. With such a configuration, the plurality of first protrusions and the plurality of second protrusions can be respectively compressed to an extent that sufficient gas tightness can be acquired.

The first and second protrusions may be disposed in a position where the first and second protrusions overlap in a plan view of the first surface.

The first and second protrusions are disposed in a position where the first and second protrusions overlap as viewed in a plan view and hence, it is possible to apply a force acting on the first protrusion and a force acting on the second protrusion uniformly as viewed in a plan view at the time of compression of the sealing member. Accordingly, stability after compression can be increased.

The protrusion amount of the first protrusion may be smaller than the protrusion amount of the second protrusion.

There is a tendency where collapsing of the first protrusion compressed by the case is more difficult than collapsing of the second protrusion compressed by the terminal or the current collector. Accordingly, by setting the protrusion amount of the first protrusion smaller than the protrusion amount of the second protrusion, it is possible to make the compression of the first protrusion easy as a whole thus ensuring flatness of the first surface after compression. In this manner, by making the first surface of the sealing member after compression flat, it is possible to maintain the case which is brought into contact with the first surface in a flat state.

An energy storage device according to another aspect of the present invention includes: a terminal which is provided on a case; a current collecting member which is electrically connected with the terminal; and a sealing member disposed between the terminal and the case or between the current collector and the case, wherein the sealing member includes: a first surface which faces the case; and a second surface which is opposite to the first surface and faces the terminal or the current collector, wherein a first protrusion is formed on the first surface, the first protrusion surrounding a shaft portion of the terminal, wherein a second protrusion is formed on the second surface, the second protrusion surrounding the shaft portion of the terminal, wherein the first and second protrusions are disposed in a state where the sealing member is compressed between the terminal and the case or between the current collector and the case, and wherein, in a state before compression, a protrusion amount of the first protrusion is different from a protrusion amount of the second protrusion.

With such a configuration, the protrusion amount of the first protrusion formed on the first surface of the sealing member and the protrusion amount of the second protrusion formed on the second surface of the sealing member are different from each other and hence, quality of the energy storage device per se can be enhanced compared with a case where the first protrusion and the second protrusion have the same protrusion amount.

A method of manufacturing an energy storage device according to another aspect of the present invention includes: arranging the above-mentioned sealing member between the terminal and the case or between the current collector and the case; and compressing the first and second protrusions by the terminal and the case or by the current collector and the case.

With such a configuration, although the protrusion amount of the first protrusion formed on the first surface of the sealing member and the protrusion amount of the second protrusion formed on the second surface of the sealing member are different from each other before assembling, the first protrusion and the second protrusion are compressed after assembling and hence, the first protrusion and the second protrusion are brought into close contact with the terminal or the current collector and the case respectively. Accordingly, quality of the energy storage device per se can be enhanced compared with a case where the first protrusion and the second protrusion have the same protrusion amount.

Hereinafter, energy storage devices according to embodiments of the present invention are described with reference to drawings. The embodiments described hereinafter are comprehensive and specific examples of the present invention. In the embodiments described hereinafter, numerical values, shapes, materials, constitutional elements, the arrangement positions and connection states of the constitutional elements, and the like are merely examples, and these are not intended to be used for limiting the present invention. Further, out of the constitutional elements in the embodiments described hereinafter, the constitutional elements which are not described in independent claims describing an uppermost concept are described as arbitrary constitutional elements.

First Embodiment

First, the configuration of an energy storage device 10 is described.

Figure 2:
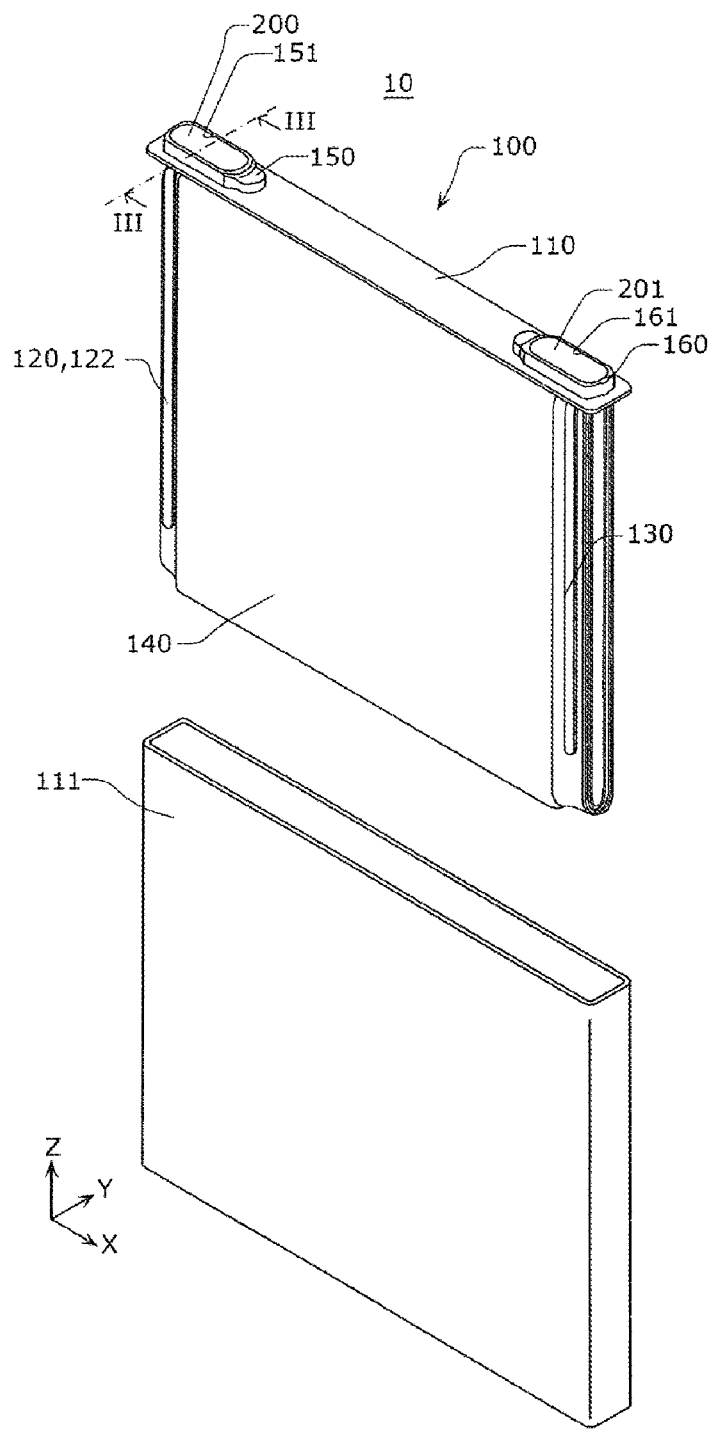
FIG. 2 is a perspective view showing respective constitutional elements which the energy storage device includes in a state where a case body of a case of the energy storage device according to the embodiment is separated.

FIG. 1 is a perspective view schematically showing an external appearance of the energy storage device 10 according to the embodiment. FIG. 2 is a perspective view showing respective constitutional elements which the energy storage device 10 includes in a state where a case body 111 of a case 100 of the energy storage device 10 according to the embodiment is separated.

In these drawings, a Z axis direction is indicated as a vertical direction, and the description will be made hereinafter assuming the Z axis direction as the vertical direction. In an actual use state, there may be a case where the Z axis direction does not agree with the vertical direction and hence, the Z axis direction is not limited to the vertical direction. The same definition is applicable also to drawings succeeding to FIG. 2.

The energy storage device 10 is a secondary battery which can charge electricity and discharge electricity. To be more specific, the energy storage device 10 is a nonaqueous electrolyte secondary battery such as a lithium ion secondary battery. The energy storage device 10 is not limited to a nonaqueous electrolyte secondary battery, and may be a secondary battery other than a nonaqueous electrolyte secondary battery, or may be a capacitor. Further, the energy storage device 10 may be a primary battery.

As shown in FIG. 1 and FIG. 2, the energy storage device 10 includes a case 100, a positive electrode terminal 200, and a negative electrode terminal 201, a positive electrode current collector 120 and a negative electrode current collector 130, a positive electrode first sealing member 150 and a negative electrode first sealing member 160, and an electrode assembly 140.

Although a liquid such as an electrolyte solution (nonaqueous electrolyte) is sealed in the case 100 of the energy storage device 10, the illustration of such a liquid is omitted. As the electrolyte solution sealed in the case 100, a kind of the electrolyte solution is not particularly limited and various kinds of electrolyte solution can be selected provided that performance of the energy storage device 10 is not impaired.

The case 100 is formed of: the case body 111 which has a bottomed rectangular cylindrical shape; and a lid body 110 which is a plate-like member for closing an opening of the case body 111. The case 100 is configured such that the inside of the case 100 can be hermetically sealed by joining the lid body 110 and the case body 111 to each other by welding or the like after the positive electrode current collector 120, the negative electrode current collector 130, the electrode assembly 140 and the like are accommodated in the inside of the case 100. A material for forming the lid body 110 and a material for forming the case body 111 are not particularly limited. For example, the lid body 110 and the case body 111 are preferably made of weldable metal such as stainless steel, aluminum, an aluminum alloy, iron, or a plated steel sheet.

The electrode assembly 140 is an energy storage element (power generating element) which includes a positive electrode, a negative electrode, and a separator, and can store electricity. The positive electrode is formed by forming a positive active material layer on a positive electrode substrate foil which is a metal foil having an elongated strip shape and made of aluminum, an aluminum alloy or the like. The negative electrode is formed by forming a negative active material layer on a negative electrode substrate foil which is a metal foil having an elongated strip shape and made of copper, a copper alloy, aluminum, an aluminum alloy or the like. The separator is formed of a microporous sheet made of a resin.

As a positive active material for forming the positive active material layer and a negative active material for forming the negative active material layer, a known material can be suitably used provided that the positive active material and the negative active material are made of a material capable of occluding and discharging lithium ions.

As the positive active material, for example, a polyanion compound such as $LiMPO_4$, $LiMSiO_4$, $LiMBO_3$ (M indicating one kind or two or more kinds of transition metal elements selected from Fe, Ni, Mn, Co and the like), a spinel compound such as lithium titanate, lithium manganate and the like, a lithium transition metal oxide such as $LiMO_2$ (M indicating one kind or two or more kinds of transition metal elements selected from Fe, Ni, Mn, Co and the like) or the like can be used.

As the negative active material, for example, in addition to lithium metal and a lithium alloy (an alloy containing lithium metal such as lithium-aluminum, lithium-silicon, lithium-lead, lithium-tin, lithium-aluminum-tin, lithium-gallium, and a Wood's alloy), an alloy which can occlude and discharge lithium, a carbon material (for example, graphite, hardly graphitizable carbon, easily graphitizable carbon, low temperature baked carbon, amorphous carbon or the like), a metal oxide, a lithium metal oxide ($Li_4Ti_5O_{12}$ or the like), a polyphosphoric acid compound or the like can be named.

The electrode assembly 140 is formed by winding the negative electrode, the positive electrode, and the separator which are disposed in a layered manner in a state where the separator is disposed between the negative electrode and the positive electrode, and the electrode assembly 140 is electrically connected to the positive electrode current collector 120 and the negative electrode current collector 130. Although FIG. 2 shows the electrode assembly 140 having an elongated circular cross section, the electrode assembly 140 may have a circular shape or an elliptical shape in cross section. Further, the electrode assembly 140 is not limited to a winding-type electrode assembly, and may be a stacking-type electrode assembly where flat-plate-like electrode plates are stacked to each other.

The positive electrode terminal 200 is an external terminal which is disposed outside the case 100, and is electrically connected to the positive electrode of the electrode assembly 140. The negative electrode terminal 201 is an external terminal which is disposed outside the case 100, and is electrically connected to the negative electrode of the electrode assembly 140. That is, the positive electrode terminal 200 and the negative electrode terminal 201 are conductive electrode terminals through which electricity stored in the electrode assembly 140 is discharged to a space outside the energy storage device 10 and through which electricity is introduced into a space inside the energy storage device 10 for storing the electricity in the electrode assembly 140. The positive electrode terminal 200 and the negative electrode terminal 201 are mounted on the lid body 110 by way of a positive electrode first sealing member 150 and a negative electrode first sealing member 160 respectively.

The positive electrode current collector 120 and the negative electrode current collector 130 are disposed inside the case 100, that is, on an inner surface of the lid body 110 (a surface of the lid body 110 on a minus side in the Z axis direction). To be more specific, the positive electrode current collector 120 is formed of a member having conductivity and rigidity, is disposed between the positive electrode of the electrode assembly 140 and a side wall of the case body 111, and is electrically connected to the positive electrode terminal 200 and the positive electrode of the electrode assembly 140. The negative electrode current collector 130 is formed of a member having conductivity and rigidity, is disposed between the negative electrode of the electrode assembly 140 and the side wall of the case body 111, and is electrically connected to the negative electrode terminal 201 and the negative electrode of the electrode assembly 140.

In the same manner as the positive electrode substrate foil of the electrode assembly 140, the positive electrode current collector 120 is made of aluminum, an aluminum alloy or the like. In the same manner as the negative electrode substrate foil of the electrode assembly 140, the negative electrode current collector 130 is made of copper, a copper alloy or the like.

The positive electrode first sealing member 150 and the negative electrode first sealing member 160 are respectively formed of a gasket, wherein at least a portion of the positive electrode first sealing member 150 is disposed between the positive electrode terminal 200 and the lid body 110 and at least a portion of the negative electrode first sealing member 160 is disposed between the negative electrode terminal 201 and the lid body 110. To be more specific, the positive electrode first sealing member 150 has a recessed portion 151 with an upper side thereof open, and the positive electrode terminal 200 is accommodated in the inside of the recessed portion 151. In the same manner, the negative electrode first sealing member 160 has a recessed portion 161 with an upper side thereof open, and the negative electrode terminal 201 is accommodated in the inside of the recessed portion 161. With such a configuration, the positive electrode terminal 200 and the negative electrode terminal 201 are mounted on the lid body 110 in a partially exposed manner.

Next, a fixing structure for fixing the positive electrode terminal 200 to the lid body 110 by way of the positive electrode first sealing member 150 together with the positive electrode current collector 120 is described. The fixing structure is substantially equal to a fixing structure for fixing the negative electrode terminal 201 to the lid body 110 by way of the negative electrode first sealing member 160 together with the negative electrode current collector 130 and hence, the description of the fixing structure on a negative electrode side is omitted.

Figure 3:
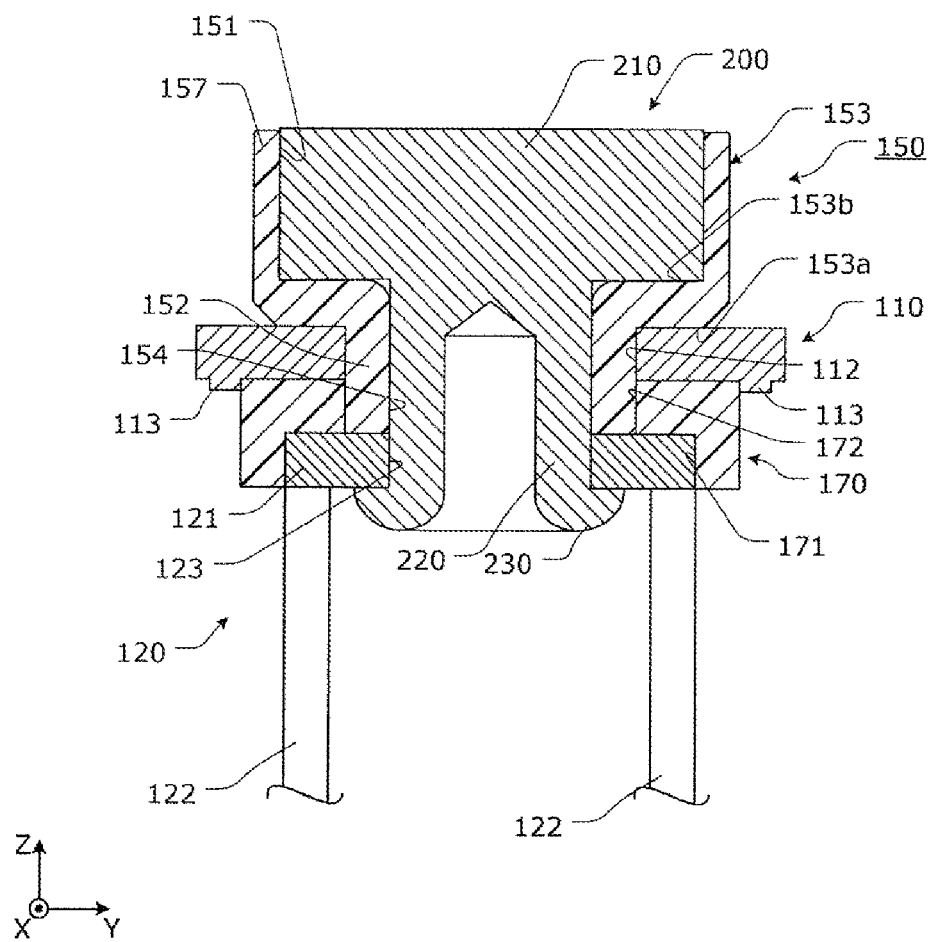
FIG. 3 is a cross-sectional view showing a schematic configuration of a fixing structure according to the first embodiment.

FIG. 3 is a cross-sectional view showing a schematic configuration of the fixing structure according to this embodiment. FIG. 3 is a cross-sectional view showing a configuration taken along a YZ plane including line III-III in FIG. 2.

As shown in FIG. 3, the positive electrode terminal 200 is mounted on the lid body 110 in a state where the positive electrode terminal 200 is accommodated in the positive electrode first sealing member 150 and, further, the positive electrode current collector 120 is mounted on the positive electrode first sealing member 150 by way of a positive electrode second sealing member 170 so that these constitutional elements are integrally fixed to each other.

First, the specific configurations of the respective members are described.

A through hole 112 is formed in the lid body 110, and a portion of the positive electrode first sealing member 150 which accommodates the positive electrode terminal 200 is inserted into the through hole 112. On a lower surface of the lid body 110, a positioning protrusion 113 for positioning the positive electrode second sealing member 170 is formed. The positioning protrusion 113 has a shape which corresponds to an outer shape of the positive electrode second sealing member 170.

The positive electrode second sealing member 170 is formed of a gasket, and at least a portion of the positive electrode second sealing member 170 is disposed between the positive electrode current collector 120 and the lid body 110. The positive electrode second sealing member 170 is preferably made of a material having lower rigidity than the lid body 110 and having insulating property. The positive electrode second sealing member 170 is formed using a resin such as polyphenylene sulfide (PPS), polypropylene (PP), polyethylene (PE), polybutylene terephthalate (PBT), polytetrafluoroethylene (PFA), polyether ether ketone (PEEK), for example.

A recessed portion 171 is formed on a bottom surface of the positive electrode second sealing member 170, and a current collector body portion 121 of the positive electrode current collector 120 is accommodated in the recessed portion 171. A through hole 172 having the same shape as the through hole 112 of the lid body 110 is formed in the recessed portion 171. The through hole 172 is disposed continuously with the through hole 112 of the lid body 110, and a cylindrical portion 152 of the positive electrode first sealing member 150 is inserted into the through holes 172, 112.

The positive electrode current collector 120 includes the current collector body portion 121 and an electrode assembly connecting portion 122 as integral parts thereof.

The current collector body portion 121 is a portion to which the positive electrode terminal 200 is connected. To be more specific, the current collector body portion 121 is formed into a flat plate shape, and has a through hole 123 into which a shaft portion 220 of the positive electrode terminal 200 is inserted.

The electrode assembly connecting portions 122 are two elongated legs respectively electrically connected to the positive electrode of the electrode assembly 140. The electrode assembly connecting portions 122 are disposed on an outer side (a minus side in the X axis direction) with respect to the through hole 123 of the current collector body portion 121. The electrode assembly connecting portions 122 are fixed to the positive electrode in a state where the electrode assembly connecting portions 122 clamp the positive electrode of the electrode assembly 140 in the Y axis direction (see FIG. 2).

The positive electrode terminal 200 is an integral body formed of a bus bar connecting portion 210 and the shaft portion 220.

The bus bar connecting portion 210 is a portion to which a bus bar (not shown in the drawing) for connecting electrode terminals of the energy storage devices 10 is connected, and an upper surface of the bus bar connecting portion 210 is formed into a planar surface.

The shaft portion 220 is a portion extending downward from a lower surface of the bus bar connecting portion 210. By swaging a distal end portion 230 of the shaft portion 220, the positive electrode first sealing member 150, the positive electrode second sealing member 170, and the positive electrode current collector 120 are fixed to the lid body 110. The distal end portion 230 of the shaft portion 220 is brought into close contact with a surface of the current collector body portion 121 in an annular shape as viewed in the Z axis direction. The distal end portion 230 and the bus bar connecting portion 210 fasten the current collector body portion 121 of the positive electrode current collector 120, the positive electrode first sealing member 150, the positive electrode second sealing member 170, and the lid body 110 by sandwiching the current collector body portion 121 of the positive electrode current collector 120, the positive electrode first sealing member 150, the positive electrode second sealing member 170, and the lid body 110 therebetween in the Z axis direction.

The positive electrode first sealing member 150 includes a terminal accommodating portion 153 and the cylindrical portion 152 as integral parts thereof.

In the terminal accommodating portion 153, the recessed portion 151 which accommodates the bus bar connecting portion 210 of the positive electrode terminal 200 is formed.

The cylindrical portion 152 projects downward from a lower surface of the terminal accommodating portion 153 in a cylindrical shape. A through hole 154 of the cylindrical portion 152 has the same shape as the through hole 123 of the positive electrode current collector 120. The through hole 154 is disposed continuously with the through hole 123 of the positive electrode current collector 120, and the shaft portion 220 of the positive electrode terminal 200 is inserted into the through holes 154, 123. An outer diameter of the cylindrical portion 152 is set to a size which allows the insertion of the cylindrical portion 152 into the through holes 172, 112.

The positive electrode first sealing member 150 is preferably formed of a member having lower rigidity than the lid body 110, and having insulation property as a whole. The positive electrode first sealing member 150 is formed using a resin such as PPS, PP, PE, PBT, PFA, PEEK, for example.

Figure 4:
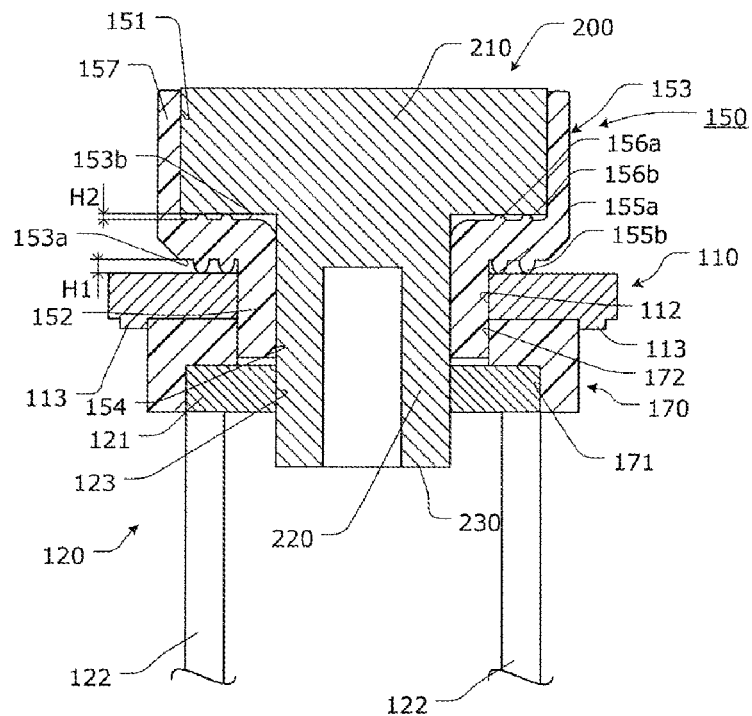
FIG. 4 is a cross-sectional view showing a state of a positive electrode terminal according to the first embodiment before a shaft portion of the positive electrode terminal is swaged.
Figure 4:
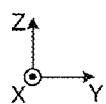
Figure 5:
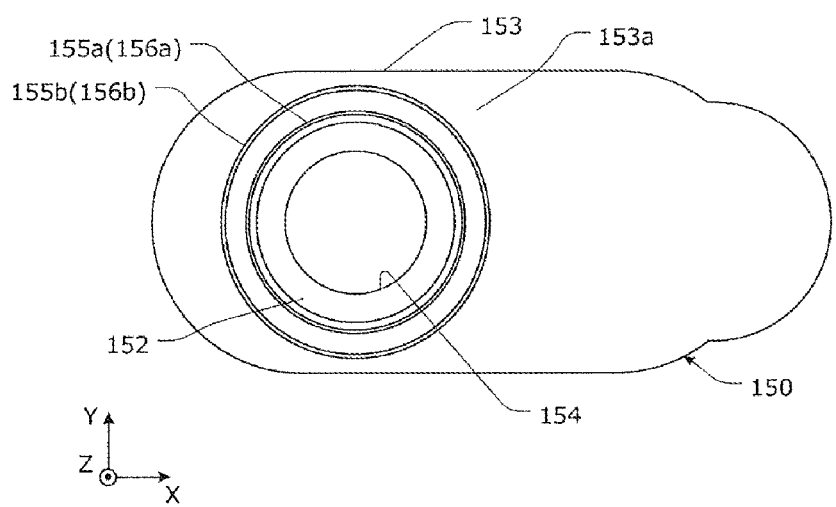
FIG. 5 is a bottom plan view of a positive electrode first sealing member corresponding to FIG. 4.
Figure 5:
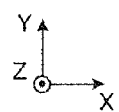

FIG. 4 is a cross-sectional view showing a state before the shaft portion 220 of the positive electrode terminal 200 according to this embodiment is swaged. FIG. 5 is a bottom plan view of the positive electrode first sealing member 150 corresponding to FIG. 4.

As shown in FIG. 4, before the shaft portion 220 of the positive electrode terminal 200 is swaged, the distal end portion of the shaft portion 220 has a shape before being deformed, and the shaft portion 220 has a cylindrical shape as a whole.

As shown in FIG. 4 and FIG. 5, a bottom surface 153a on an outer side of the terminal accommodating portion 153 of the positive electrode first sealing member 150 forms a first surface which opposedly faces the lid body 110 which forms a portion of the case 100. On the bottom surface 153a, two first protrusions 155a, 155b which surround the shaft portion 220 of the positive electrode terminal 200 are formed. To be more specific, two first protrusions 155a, 155b are protrusions each having a semielliptical spherical shape in cross section, and are respectively formed in a circular annular shape about an axis of the cylindrical portion 152. The first protrusion 155a is disposed on a side close to the shaft portion 220, and the first protrusion 155b is disposed on a side remote from the shaft portion 220. Two first protrusions 155a, 155b have the same protrusion amount H1. The protrusion amount H1 is a height ranging from a proximal end to a distal end of each first protrusion 155a, 155b.

A bottom surface 153b of the terminal accommodating portion 153 of the positive electrode first sealing member 150 on an inner side forms a second surface which opposedly faces the bus bar connecting portion 210 of the positive electrode terminal 200 on a side opposite to the bottom surface 153a which forms the first surface. On the bottom surface 153b, two second protrusions 156a, 156b which surround the shaft portion 220 of the positive electrode terminal 200 are formed. To be more specific, two second protrusions 156a, 156b are protrusions each having a semicircular shape in cross section, and are respectively formed into a circular annular shape about the axis of the cylindrical portion 152. The second protrusion 156a is disposed on a side close to the shaft portion 220, and the second protrusion 156b is disposed on a side remote from the shaft portion 220. Further, when the bottom surfaces 153a, 153b are viewed in a plan view, the first protrusion 155a and the second protrusion 156a are disposed in a position where the first protrusion 155a and the second protrusion 156b overlap with each other, and the first protrusion 155b and the second protrusion 156b are disposed in a position where the first protrusion 155b and the second protrusion 156b overlap with each other.

Two second protrusions 156a, 156b have the same protrusion amounts H2. The protrusion amount H2 is a height ranging from a proximal end to a distal end of the second protrusion 156a, 156b.

The protrusion amount H1 of the first protrusion 155a, 155b is set larger than the protrusion amount H2 of the second protrusion 156a, 156b. With such a configuration, a collapsing margin of the first protrusion 155a, 155b after compression can be set larger than a collapsing margin of the second protrusion 156a, 156b after compression.

In this embodiment, the first protrusions 155a, 155b and the second protrusions 156a, 156b are formed concentrically. However, these protrusions may not be formed concentrically. Further, the planar shapes of the first protrusions 155a, 155b and the second protrusions 156a, 156b may not be formed in a circular annular shape, and may be formed into any other shapes provided that these protrusions are formed annularly. As other planar shapes, for example, a polygonal shape such as a triangular shape, a quadrangular shape, an elliptical shape or the like can be named.

Further, the first protrusions 155a, 155b and the second protrusions 156a, 156b may have any shapes in cross section provided that the first protrusions 155a, 155b and the second protrusions 156a, 156b are formed in a protruding manner. As other cross-sectional shapes, for example, a polygonal shape such as a triangular shape, a quadrangular shape or the like can be named.

It is desirable that the first protrusions 155a, 155b and the second protrusions 156a, 156b be formed in a continuous annular shape as a whole respectively. However, it is sufficient that the first protrusions 155a, 155b and the second protrusions 156a, 156b have an approximately annular shape in appearance. To be more specific, the first protrusions 155a, 155b and the second protrusions 156a, 156b may have gaps in a circumferential direction intermittently respectively.

Next, a method of manufacturing the energy storage device 10 is described.

First, as shown in FIG. 4, the cylindrical portion 152 of the positive electrode first sealing member 150 is inserted into the through hole 112 of the lid body 110. Subsequently, the shaft portion 220 of the positive electrode terminal 200 is inserted into the through hole 154 of the positive electrode first sealing member 150. Then, the cylindrical portion 152 of the positive electrode first sealing member 150 is inserted into the through hole 172 of the positive electrode second sealing member 170 and, thereafter, the shaft portion 220 of the positive electrode terminal 200 is inserted into the through hole 123 of the positive electrode current collector 120.

When the shaft portion 220 of the positive electrode terminal 200 is swaged in such a state, the distal end portion 230 of the shaft portion 220 is pressed so as to expand outward so that the shaft portion 220 is brought into close contact with the surface of the current collector body portion 121 over the whole circumference. With such a configuration, a close contact state between the distal end portion 230 of the shaft portion 220 and the current collector body portion 121 can be enhanced. Further, by such swaging, the distal end portion 230 of the shaft portion 220 and the bus bar connecting portion 210 fasten the current collector body portion 121 of the positive electrode current collector 120, the positive electrode first sealing member 150, the positive electrode second sealing member 170, and the lid body 110 together by sandwiching the current collector body portion 121 of the positive electrode current collector 120, the positive electrode first sealing member 150, the positive electrode second sealing member 170, and the lid body 110 in the Z axis direction. With such a configuration, a distance between the lid body 110 and the bus bar connecting portion 210 is narrowed so that the first protrusions 155a, 155b and the second protrusions 156a, 156b are respectively compressed thus bringing about a state shown in FIG. 3.

In the same manner as the steps described above, the negative electrode first sealing member 160, a negative electrode second sealing member (not shown in the drawing), the negative electrode current collector 130, and the negative electrode terminal 201 are mounted also on the negative electrode side of the lid body 110.

Next, the positive electrode of the electrode assembly 140 is mounted on the positive electrode current collector 120 and, at the same time, the negative electrode of the electrode assembly 140 is mounted on the negative electrode current collector 130.

Thereafter, in a state shown in FIG. 2, the electrode assembly 140 is accommodated in the case body 111 of the case 100, and the lid body 110 is welded to the case body 111 thus assembling the case 100. Next, an electrolyte solution is poured into an electrolyte solution filling port not shown in the drawing and, thereafter, the electrolyte solution filling port is closed by welding an electrolyte solution filling plug to the lid body 110 thus manufacturing the energy storage device 10 shown in FIG. 1.

As described above, according to this embodiment, the protrusion amount H1 of the first protrusion 155a, 155b is larger than the protrusion amount H2 of the second protrusion 156a, 156b and hence, a collapsing margin of the first protrusion 155a, 155b can be increased. Accordingly, after compression of the positive electrode first sealing member 150, a close contact state between the compressed first protrusions 155a, 155b and the lid body 110 can be enhanced. Further, the collapsing margin is large and hence, gas tightness can be maintained over a long period.

In this manner, compared with a case where the first protrusion 155a, 155b and the second protrusion 156a, 156b have the same protrusion amount, quality of the energy storage device 10 can be enhanced.

The plurality of first protrusions 155a, 155b are formed and the shaft portion 220 of the positive electrode terminal 200 is surrounded doubly coaxially by the first protrusions 155a, 155b and hence, gas tightness on a lid body 110 side can be enhanced.

The plurality of second protrusions 156a, 156b are formed and the shaft portion 220 of the positive electrode terminal 200 is surrounded doubly coaxially by the second protrusions 156a, 156b and hence, gas tightness on a bus bar connecting portion 210 side of the positive electrode terminal 200 can be enhanced.

Further, the first protrusions 155a, 155b and the second protrusions 156a, 156b are respectively disposed in a position where the first protrusion 155a and the second protrusion 156a overlap with each other and the position where the first protrusion 155b and the second protrusion 156b overlap with each other as viewed in a plan view and hence, forces acting on the first protrusions 155a, 155b and the second protrusions 156a, 156b at the time of compression can be distributed uniformly as viewed in a plan view. Accordingly, stability after compression can be increased.

Modification 1

Next, a modification 1 according to the first embodiment is described. In the description made hereinafter, parts corresponding to the parts of the first embodiment are given the same symbols and the description of these parts may be omitted.

In the first embodiment, the case is exemplified where the plurality of first protrusions 155a, 155b have the same protrusion amount H1 and the plurality of second protrusions 156a, 156b have the same protrusion amount H2. However, to further increase a gas tightness, protrusion amounts of the first protrusions 155a, 155b or protrusion amounts of the second protrusions 156a, 156b may differ from each other.

Figure 6:
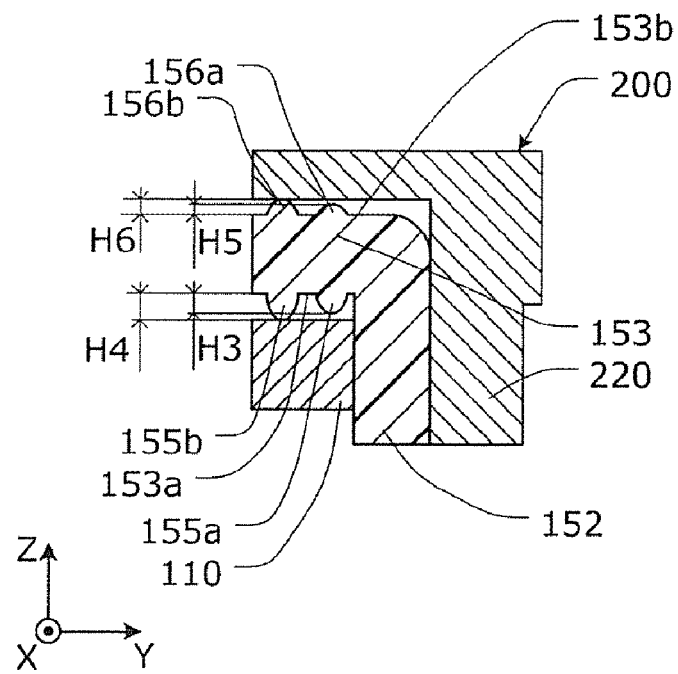
FIG. 6 is a cross-sectional view showing two first protrusions and two second protrusions according to a modification 1 in an enlarged manner.

FIG. 6 is a cross-sectional view showing two first protrusions 155a, 155b and two second protrusions 156a, 156b according to the modification 1 in an enlarged manner. In FIG. 6, a state before compression is shown.

As shown in FIG. 6, the respective protrusion amounts H3, H4 of two first protrusions 155a, 155b are set such that the protrusion amounts H3, H4 are larger for the first protrusions 155a, 155b which are farther from the shaft portion 220 of the positive electrode terminal 200. The positive electrode first sealing member 150 has a property where when the positive electrode first sealing member 150 is compressed between the positive electrode terminal 200 and the lid body 110, the closer to the shaft portion 220 of the positive electrode terminal 200, the larger a compressive force becomes. That is, even when the protrusion amount of the first protrusion 155a is small near the shaft portion 220 of the positive electrode terminal 200, the first protrusion 155a can be compressed to an extent that gas tightness can be acquired. In other words, by setting the respective protrusion amounts H3, H4 of two first protrusions 155a, 155b such that the protrusion amounts H3, H4 are larger for the first protrusions 155a, 155b which are farther from the shaft portion 220 of the positive electrode terminal 200, any one of the first protrusions 155a, 155b can be compressed to an extent that sufficient gas tightness can be acquired.

On the other hand, respective protrusion amounts H5, H6 of two second protrusions 156a, 156b are set such that the protrusion amounts H5, H6 are larger for the second protrusions 156a, 156b which are farther from the shaft portion 220 of the positive electrode terminal 200. With such a configuration, by setting the respective protrusion amounts of two second protrusions 156a, 156b such that the protrusion amounts are larger for the second protrusions 156a, 156b which are farther from the shaft portion 220 of the positive electrode terminal 200, any one of the second protrusions 156a, 156b can be compressed to an extent that sufficient gas tightness can be acquired.

The protrusion amount H3 of the first protrusion 155a and the protrusion amount H6 of the second protrusion 156b may be equal to each other. That is, although it is desirable that the respective protrusion amounts be set to satisfy the relationship of H4>H3≥H6>H5. It is sufficient that at least the protrusion amount H4 of the first protrusion 155b disposed on an outer side be largest and the protrusion amount H5 of the second protrusion 156a disposed on an inner side be smallest.

It is needless to say that the relationship of the respective protrusion amounts is merely an example. That is, it is sufficient that at least one of the protrusion amounts H3, H4 of the plurality of first protrusions 155a, 155b be larger than at least one of the protrusion amounts H5, H6 of the plurality of second protrusions 156a, 156b. Further, it is preferable that at least one of the plurality of first protrusions 155a, 155b be larger than the second protrusion having the largest protrusion amount in protrusion amount among the plurality of second protrusions 156a, 156b.

Figure 7:
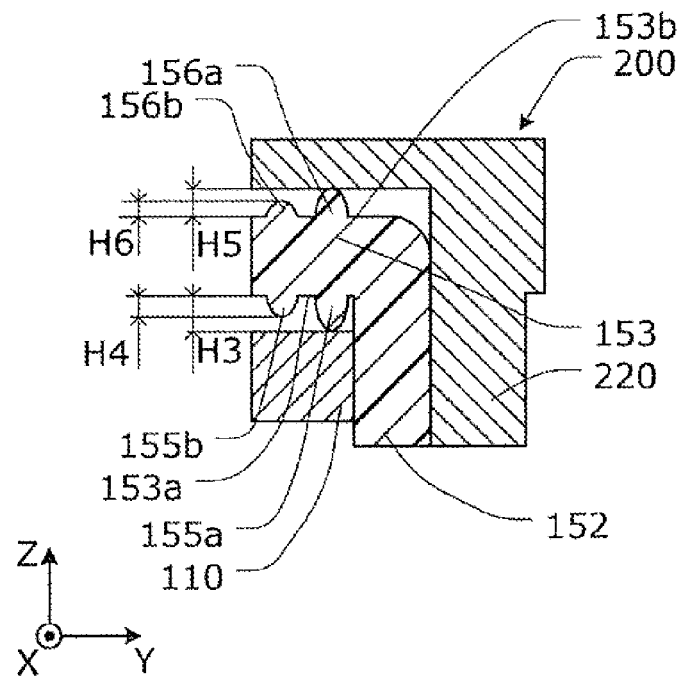
FIG. 7 is a cross-sectional view showing a relationship in a protrusion amount between two first protrusions and two second protrusions.

FIG. 7 is a cross-sectional view showing another relationship in protrusion amount between two first protrusions and two second protrusions. In FIG. 7, respective protrusion amounts are set to satisfy the relationship of H3>H5>H4>H6.

Also in this case, a collapsing margin of at least one first protrusion 155a can be increased thus enhancing a close contact state between the compressed first protrusion 155a and the lid body 110. Further, the protrusion amount of other first protrusion 155b may be set smaller than a protrusion amount of the second protrusion 156a and hence, the degree of freedom in designing the sealing member can be increased.

Also in a case where there are three or more first protrusions and second protrusions, it is sufficient for the first protrusions and the second protrusions to be set such that the protrusion amounts are larger for the first and second protrusions which are farther from the shaft portion 220 of the positive electrode terminal 200.

Further, respective protrusion amounts of the plurality of first protrusions may be set such that the protrusion amount is smaller for the first protrusion on which a stress acting is larger, and respective protrusion amounts of the plurality of second protrusions may be set such that the protrusion amount is smaller for the second protrusion on which a stress acting is larger. With such a configuration, the plurality of first protrusions and the plurality of second protrusions can be respectively compressed to an extent that sufficient gas tightness can be acquired.

As a method of measuring a stress acting on the plurality of first protrusions and the plurality of second protrusions respectively in a compression state, there is a method where hardnesses (Vickers hardnesses), strengths or the like of the plurality of first protrusions and the plurality of second protrusions are respectively measured, and a stress at the time of compression is estimated based on a measurement result.

Modification 2

Next, a modification 2 according to the first embodiment is described. In the first embodiment, the case is exemplified where the first protrusions 155a, 155b and the second protrusions 156a, 156b are formed on the positive electrode first sealing member 150. In this modification 2, the description is made by exemplifying a case where first protrusions and second protrusions are formed on a positive electrode second sealing member.

Figure 8:
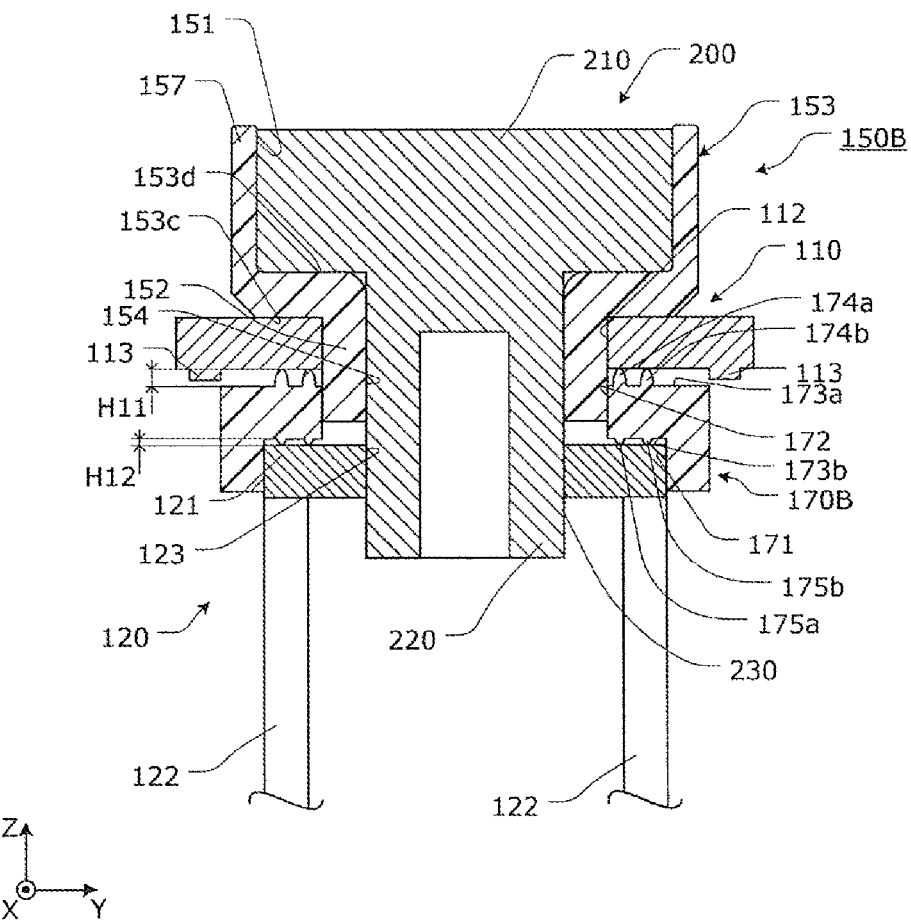
FIG. 8 is a cross-sectional view showing a schematic configuration of a positive electrode second sealing member according to a modification 2.

FIG. 8 is a cross-sectional view showing a schematic configuration of a positive electrode second sealing member according to the modification 2. To be more specific, FIG. 8 is a view corresponding to FIG. 4.

As shown in FIG. 8, a positive electrode first sealing member 150B is made of a single resin as a whole, and a bottom surface 153c on an outer side which forms a first surface and a bottom surface 153d on an inner side which forms a second surface are formed in a planar surface. That is, the positive electrode first sealing member 150B according to the modification 2 includes neither first protrusions 155a, 155b nor second protrusions 156a, 156b.

An upper surface 173a on an outer side of the positive electrode second sealing member 170B forms a first surface which opposedly faces a lid body 110. On the upper surface 173a, two first protrusions 174a, 174b which surround a shaft portion 220 of a positive electrode terminal 200 are formed. To be more specific, two first protrusions 174a, 174b are protrusions each having a semielliptical shape as viewed in cross section, and are formed in a circular annular shape about an axis of a cylindrical portion 152. The first protrusion 174a is disposed on a side close to the shaft portion 220, and the first protrusion 174b is disposed on a side remote from the shaft portion 220. Further, two first protrusions 174a, 174b have the same protrusion amount H11.

An upper surface 173b in a recessed portion 171 of the positive electrode second sealing member 170B forms a second surface which opposedly faces a positive electrode current collector 120 on a side opposite to the upper surface 173a. On the upper surface 173b, two second protrusions 175a, 175b which surround the shaft portion 220 of the positive electrode terminal 200 are formed. To be more specific, two second protrusions 175a, 175b are protrusions each having a semicircular shape as viewed in cross section, and are formed in a circular annular shape about the axis of the cylindrical portion 152. The second protrusion 175a is disposed on a side close to the shaft portion 220, and the second protrusion 175b is disposed on a side remote from the shaft portion 220. Further, when the upper surfaces 173a, 173b are viewed in a plan view, the first protrusion 174a and the second protrusion 175a are disposed in a position where the first protrusion 174a and the second protrusion 175a overlap with each other, and the first protrusion 174b and the second protrusion 175b are disposed in a position where the first protrusion 174b and the second protrusion 175b overlap with each other.

Two second protrusions 175a, 175b have the same protrusion amount H12. Here, a protrusion amount H11 of the first protrusions 174a, 174b is set larger than the protrusion amount H12 of the second protrusions 175a, 175b. With such a configuration, when the first protrusions 174a, 174b and the second protrusions 175a, 175b are respectively compressed by swaging the shaft portion 220 of the positive electrode terminal 200, a collapsing margin of the first protrusions 174a, 174b after compression can be increased compared to a collapsing margin of the second protrusions 175a, 175b. Accordingly, after compression of the positive electrode first sealing member 150, a close contact state between the compressed first protrusions 174a, 174b and the positive electrode current collector 120 can be increased.

Both the positive electrode second sealing member 170B and the positive electrode first sealing member 150 according to the first embodiment may be used simultaneously. With such a configuration, high gas tightness can be exhibited on both a positive electrode terminal 200 side and a positive electrode current collector 120 side.

In a case where the positive electrode first sealing member 150 according to the above-mentioned first embodiment is not used, and the positive electrode first sealing member which has neither the first protrusions 155a, 155b nor the second protrusions 156a, 156b and the positive electrode second sealing member 170B are used simultaneously, gas tightness may be ensured by welding the positive electrode current collector 120 and the positive electrode terminal 200 to each other.

Modification 3

In the first embodiment, the case is exemplified where peripheries of the first protrusions 155a, 155b and peripheries of the second protrusions 156a, 156b are formed in a planar surface respectively. In this modification 3, the case is exemplified where an annular groove portion is formed on peripheries of the first protrusions 155a, 155b and peripheries of second protrusions 156a, 156b respectively.

Figure 9:
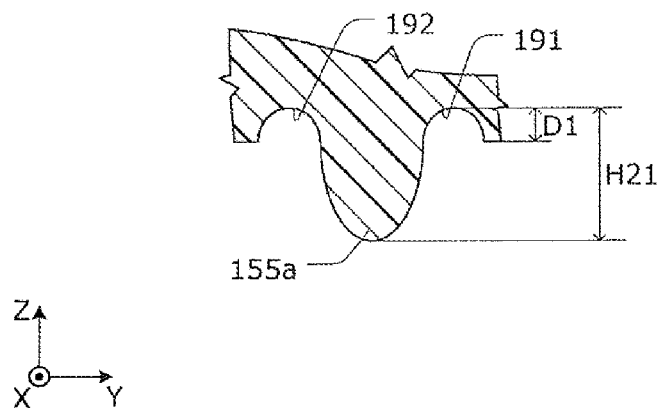
FIG. 9 is a cross-sectional view showing a first protrusion and a peripheral portion of the first protrusion according to a modification 3 in an enlarged manner.

FIG. 9 is a cross-sectional view showing a peripheral portion of a first protrusion 155a according to the modification 3 in an enlarged manner. In FIG. 9, although only the first protrusion 155a is shown, the first protrusion 155b and the second protrusions 156a, 156b respectively have the same peripheral structure.

As shown in FIG. 9, groove portions 191, 192 are formed inside and outside the first protrusion 155a respectively. The groove portions 191, 192 respectively have a semicircular shape in cross section, and are formed over the whole circumference of the annular first protrusion 155a. A proximal portion of the first protrusion 155a forms bottoms of the groove portions 191, 192. Accordingly, a protrusion amount H21 of the first protrusion 155a is a portion shown in FIG. 9.

Even when the first protrusion 155a is compressed by swaging the shaft portion 220 of the positive electrode terminal 200, it is extremely difficult to collapse the first protrusion 155a to an extent that a protrusion amount of the first protrusion 155a becomes zero. For example, when it is assumed that the protrusion amount H21 before compression is 0.1 mm and the first protrusion 155a can be collapsed by 70% by compression by swaging, a protrusion amount of the first protrusion 155a after compression is 0.03 mm. When the periphery of the first protrusion 155a is formed in a planar surface, the first protrusion 155a which is compressed to 0.03 mm remains on the planar surface as it is and hence, the first protrusion 155a affects the flatness of the lid body 110. However, in the modification 3, the groove portions 191, 192 are formed inside and outside the first protrusion 155a and hence, a protrusion amount of the first protrusion 155a after compression can be absorbed by the groove portions 191, 192. Accordingly, the lid body 110 can be disposed in a flattened manner after compression thus suppressing lifting of the lid body 110.

It is desirable that depth D1 of the groove portions 191, 192 be set to a depth which allows the groove portions 191, 192 to absorb a protrusion amount of the first protrusion 155a after compression. For example, as described above, when a protrusion amount of the first protrusion 155a after compression is 0.03 mm, the depth D1 of the groove portions 191, 192 are set to a depth deeper than 0.03 mm.

Second Embodiment

In the first embodiment, the energy storage device 10 which can enhance gas tightness by setting the protrusion amount H1 of the first protrusions 155a, 155b larger than the protrusion amount H2 of the second protrusions 156a, 156b is exemplified. In the second embodiment, the description is made with respect to a structure which can enhance flatness of a positive electrode terminal and a case with respect to sealing members (a positive electrode first sealing member and a positive electrode second sealing member) after compression. Also in this second embodiment, parts corresponding to the parts of the first embodiment are given the same symbols and the description of the parts may be omitted.

Figure 10:
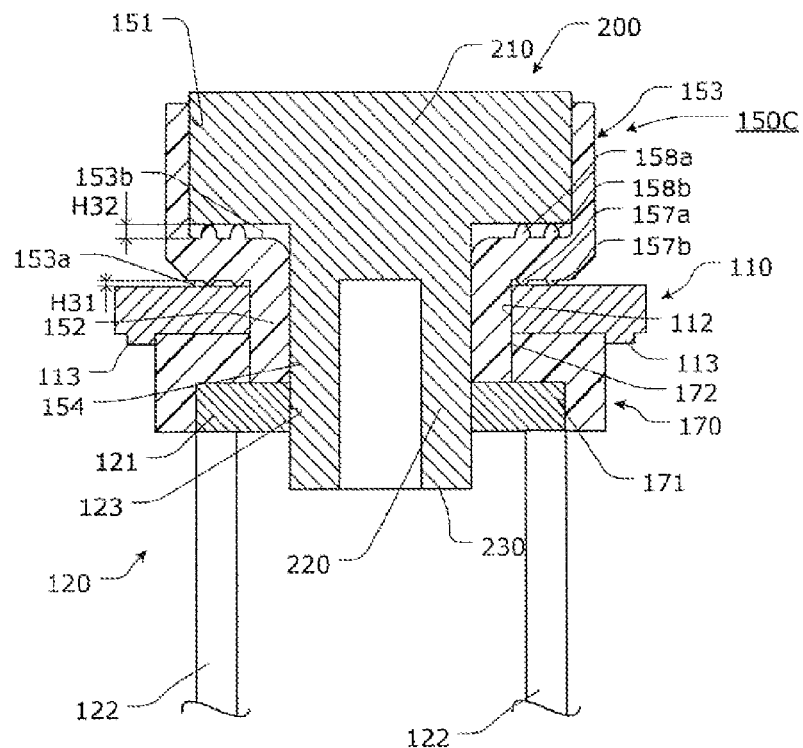
FIG. 10 is a cross-sectional view showing a state of a positive electrode terminal according to a second embodiment before a shaft portion of the positive electrode terminal is swaged.

FIG. 10 is a cross-sectional view showing a state before a shaft portion 220 of a positive electrode terminal 200 according to this embodiment is swaged. To be more specific, FIG. 10 is a view corresponding to FIG. 4.

As shown in FIG. 10, a fixing structure according to this embodiment is substantially equal to the structure of the first embodiment, and a point which makes this embodiment different from the first embodiment lies in a relationship between a protrusion amount H31 of first protrusions 157a, 157b and a protrusion amount H32 of second protrusions 158a, 158b. That is, in this embodiment, the protrusion amount H31 of the first protrusions 157a, 157b is set smaller than the protrusion amount H32 of the second protrusions 158a, 158b.

There is a tendency where collapsing of the first protrusions 157a, 157b compressed by the lid body 110 is more difficult than collapsing of the second protrusions 158a, 158b compressed by the positive electrode terminal 200. Accordingly, by setting the protrusion amount H31 of the first protrusions 157a, 157b smaller than the protrusion amount H32 of the second protrusions 158a, 158b, it is possible to make the compression of the first protrusions 157a, 157b easy as a whole thus ensuring flatness of the bottom surface 153a after compression. In this manner, by making the bottom surface 153a of the positive electrode first sealing member 150C after compression flat, it is possible to maintain the lid body 110 which is brought into contact with the bottom surface 153a flat.

As described above, compared to a case where the first protrusions 157a, 157b and the second protrusions 158a, 158b have the same protrusion amount, a quality of the energy storage device 10 can be enhanced.

Modification 4

Next, a modification 4 according to the second embodiment is described. In the description made hereinafter, parts corresponding to the parts of the second embodiment are given the same symbols and the description of these parts may be omitted.

In the second embodiment, a case where the plurality of first protrusions 157a, 157b have the same protrusion amount H31, and the plurality of second protrusions 158a, 158b have the same protrusion amount H32 is exemplified. However, to further enhance flatness, the first protrusions 157a, 157b or the second protrusions 158a, 158b may differ from each other in protrusion amount.

Figure 11:
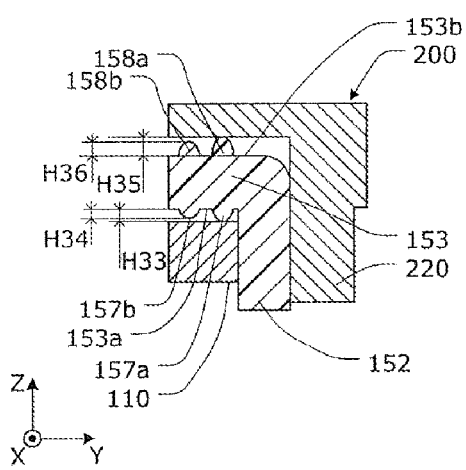
FIG. 11 is a cross-sectional view showing two first protrusions and two second protrusions according to a modification 4 in an enlarged manner.

FIG. 11 is a cross-sectional view showing two first protrusions 157a, 157b and two second protrusions 158a, 158b according to the modification 4 in an enlarged manner. FIG. 11 shows a state before compression.

As shown in FIG. 11, protrusion amounts H33, H34 of two first protrusions 157a, 157b are set such that the protrusion amounts H33, H34 are smaller for the first protrusions 157a, 157b which are farther from the shaft portion 220 of the positive electrode terminal 200. As described above, the positive electrode first sealing member 150 has a property where when the positive electrode first sealing member 150 is compressed between the positive electrode terminal 200 and the lid body 110, the closer to the shaft portion 220 of the positive electrode terminal 200, the larger a compressive force becomes. That is, even when the first protrusions 157a, 157b having the same protrusion amount H32 are provided, a compression amount of the first protrusion 157a on a side close to the shaft portion 220 becomes large and a compression amount of the first protrusion 157b on a side remote from the shaft portion 220 becomes small and hence, irregularities are generated in protrusion amount after compression. Such irregularities in protrusion amount deteriorate flatness of the lid body 110. In this modification 4, by setting the protrusion amounts H33, H34 of two first protrusions 157a, 157b such that the protrusion amounts H33, H34 are smaller for the first protrusions 157a, 157b which are farther from the shaft portion 220 of the positive electrode terminal 200, irregularities in protrusion amount after compression can be suppressed thus ensuring flatness of the lid body 110 with respect to the positive electrode first sealing member 150.

On the other hand, protrusion amounts H35, H36 of two second protrusions 158a, 158b are also set such that the protrusion amounts H35, H36 are smaller for the second protrusions 158a, 158b which are farther from the shaft portion 220 of the positive electrode terminal 200. With such a configuration, irregularities in protrusion amount after compression of two second protrusions 158a, 158b can be suppressed thus ensuring flatness of the positive electrode terminal 200 with respect to the positive electrode first sealing member 150.

The protrusion amount H33 of the first protrusion 157a and the protrusion amount H36 of the second protrusion 158b may be equal to each other. That is, it is desirable that the respective protrusion amounts satisfy the relationship H35>H36≥H33>H34. However, it is sufficient that at least the protrusion amount H34 of the first protrusion 157b disposed on an outer side be smallest and the protrusion amount H35 of the second protrusion 158a disposed on an inner side be largest.

Also in a case where there are three or more first protrusions and second protrusions, it is sufficient for the first protrusions and the second protrusions be set such that the protrusion amounts are smaller for the first and second protrusions which are farther from the shaft portion 220 of the positive electrode terminal 200 respectively.

Modification 5

Next, a modification 5 according to the second embodiment is described. In the second embodiment, a case is exemplified where first protrusions 157a, 157b and second protrusions 158a, 158b are formed on a positive electrode first sealing member 150C. In this modification 5, a case is exemplified where first protrusions and second protrusions are formed on a positive electrode second sealing member.

Figure 12:
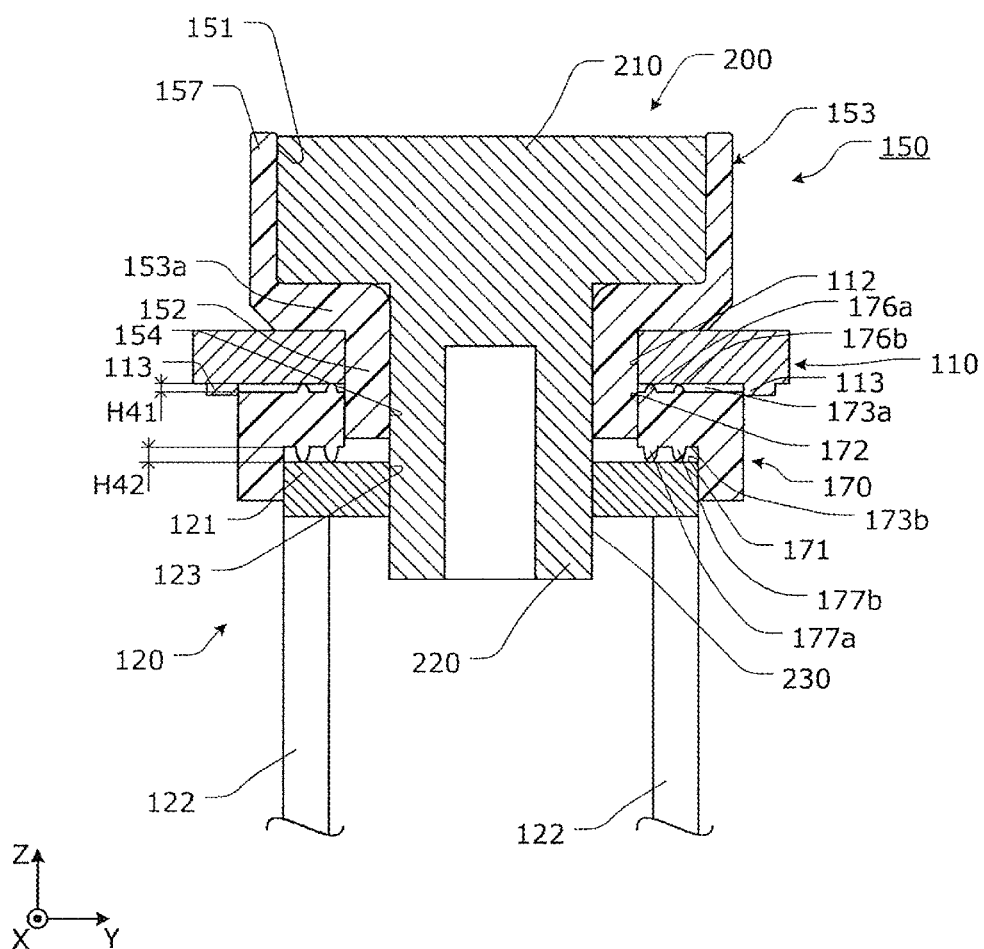
FIG. 12 is a cross-sectional view showing a schematic configuration of a positive electrode second sealing member according to a modification 5.

FIG. 12 is a cross-sectional view showing a schematic configuration of the positive electrode second sealing member according to the modification 5. To be more specific, FIG. 12 is a view corresponding to FIG. 8.

As shown in FIG. 12, a structure according to the modification 5 is substantially equal to the structure according to the modification 2, and a point which makes the modification 5 different from the modification 2 lies in the relationship of a protrusion amount H41 of first protrusions 176a, 176b and a protrusion amount H42 of second protrusions 177a, 177b. That is, in the modification 5, the protrusion amount H41 of the first protrusions 176a, 176b is set smaller than the protrusion amount H42 of the second protrusions 177a, 177b.

Accordingly, in the description made hereinafter, parts corresponding to the parts of the modification 2 are given the same symbols, and the description of these parts may be omitted.

As shown in FIG. 12, two first protrusions 176a, 176b have the same protrusion amount H41, and two second protrusions 177a, 177b have the same protrusion amount H42. The protrusion amount H41 of the first protrusions 176a, 176b is set smaller than the protrusion amount H42 of the second protrusions 177a, 177b. With such a configuration, the first protrusions 176a, 176b can be easily compressed as a whole, and a flatness of an upper surface 173a after compression can be ensured. Accordingly, it is possible to maintain the lid body 110 which is brought into contact with the upper surface 173a flat.

Other Embodiments

Although the sealing members, the energy storage devices and the like according to the embodiments of the present invention and the modifications of the embodiments have been described, the present invention is not limited to the above-mentioned embodiments and the modifications of the embodiments. That is, it should be construed that the embodiments and the modifications of the embodiments disclosed in this specification are only for an exemplifying purpose in all aspects and are not limited. The scope of the present invention is not designated by the above-mentioned description but is designated by Claims, and it is intended that all modifications which fall within the meaning and the scope equivalent to Claims are also included in the scope of the present invention.

For example, in the above-mentioned embodiments and the modifications of the embodiments, the energy storage device 10 includes one electrode assembly 140. However, the energy storage device 10 may include a plurality of electrode assemblies.

In the above-mentioned embodiments and the modifications of the embodiments, the positive electrode terminal 200 formed by integrally molding the bus bar connecting portion 210 and the shaft portion 220 is exemplified. However, the bus bar connecting portion and the shaft portion may be provided as separate bodies, and the bus bar connecting portion and the shaft portion may be integrally joined to each other by assembling as a positive electrode terminal.

In the above-mentioned embodiments and the modifications of the embodiments, the case has been exemplified where the first protrusions 155*a*, 155*b* and the second protrusions 156*a*, 156*b* respectively surround the shaft portion 220 doubly coaxially. However, the first protrusions and the second protrusions may respectively surround the shaft portion 220 singly or in triple or more coaxially. When the shaft portion 220 is surrounded by the protrusions in triple or more, gas tightness can be further increased. Further, the number of first protrusions and the number of second protrusions may differ from each other. When the number of first protrusions and the number of second protrusions are different from each other, it is preferable that at least one set of the first protrusion and the second protrusion overlap with each other as viewed in a plan view from a viewpoint of ensuring gas tightness.

In the above-mentioned embodiments, the description has been made with respect to the specific configuration of portions which are the technical features of the present invention by exemplifying the configurations on the positive electrode side. However, it is needless to say that substantially the same configurations are applied also to the negative electrode side. The configurations on the positive electrode side and the configurations on the negative electrode side may differ from each other without departing from the gist of the present invention.

The configurations which are made by arbitrarily combining the configurations of the above-mentioned embodiments and the configurations of the modifications are also included in the scope of the present invention.

INDUSTRIAL APPLICABILITY

The present invention is applicable to an energy storage device and the like such as a lithium ion secondary battery.

DESCRIPTION OF REFERENCE SIGNS

10: energy storage device
100: case
110: lid body
111: case body
112, 123, 154, 172: through hole
113: protrusion
120: positive electrode current collector (current collector)
121: current collector body portion
122: electrode assembly connecting portion
130: negative electrode current collector
140: electrode assembly
150, 150B, 150C: positive electrode first sealing member (sealing member)
151, 161, 171: recessed portion
152: cylindrical portion
153: terminal accommodating portion
153*a*, 153*c*: bottom surface (first surface)
153*b*, 153*d*: bottom surface (second surface)
155*a*, 155*b*, 157*a*, 157*b*, 174*a*, 174*b*, 176*a*, 176*b*: first protrusion
156*a*, 156*b*, 158*a*, 158*b*, 175*a*, 175*b*, 177*a*, 177*b*: second protrusion
160: negative electrode first sealing member
170, 170B: positive electrode second sealing member
173*a*, 173*b*: upper surface
191, 192: groove portion
200: positive electrode terminal (terminal)
201: negative electrode terminal
210: bus bar connecting portion
220: shaft portion
230: distal end portion
H1, H2, H3, H4, H5, H6, H11, H12, H21, H31, H32, H33, H34, H35, H36, H41, H42: protrusion amount

The invention claimed is:

1. A sealing member disposed between a terminal, which is provided on a case of an energy storage device, and the case or between a current collector, which is electrically connected with the terminal, and the case, the sealing member comprising:
    a first surface which faces the case; and
    a second surface which is opposite to the first surface and faces the terminal or the current collector,
    wherein a first protrusion is formed on the first surface, the first protrusion surrounding a shaft portion of the terminal,
    wherein a second protrusion is formed on the second surface, the second protrusion surrounding the shaft portion of the terminal, and
    wherein, in a stacking direction of the sealing member on the case and the current collector, a protrusion amount of the first protrusion is different from a protrusion amount of the second protrusion.

2. The sealing member according to claim 1, wherein the protrusion amount of the first protrusion is larger than the protrusion amount of the second protrusion.

3. The sealing member according to claim 2, wherein the first protrusion comprises a plurality of first protrusions, the plurality of first protrusions surrounding the shaft portion of the terminal co-axially.

4. The sealing member according to claim 3, wherein respective protrusion amounts of the first protrusions are set such that the protrusion amount is larger for the first protrusion which is farther from the shaft portion of the terminal.

5. The sealing member according to claim 1, wherein the second protrusion comprises a plurality of second protrusions, the plurality of second protrusions surrounding the shaft of the terminal co-axially.

6. The sealing member according to claim 5, wherein respective protrusion amounts of the second protrusions are set such that the protrusion amount is larger for the second protrusion which is farther from the shaft portion of the terminal.

7. The sealing member according to claim 1, wherein the first protrusion comprises a plurality of first protrusions, the plurality of first protrusions surrounding the shaft portion of the terminal co-axially,
wherein the second protrusion comprises a plurality of second protrusions, the plurality of second protrusions surrounding the shaft portion of the terminal co-axially, and
wherein at least one of protrusion amounts of the first protrusions is larger than at least one of protrusion amounts of the second protrusions.

8. The sealing member according to claim 3, wherein the second protrusion comprises a plurality of second protrusions, the plurality of second protrusions surrounding the shaft portion co-axially,
wherein respective protrusion amounts of the first protrusions in a compressed state are set such that the protrusion amount is smaller for the first protrusion on which a stress acting is larger, and
wherein respective protrusion amounts of the second protrusions in a compressed state are set such that the protrusion amount is smaller for the second protrusion on which a stress acting is larger.

9. The sealing member according to claim 1, wherein the first and second protrusions are disposed in a position where the first and second protrusions overlap in a plan view of the first surface.

10. The sealing member according to claim 1, wherein the protrusion amount of the first protrusion is smaller than the protrusion amount of the second protrusion.

11. An energy storage device, comprising:
a terminal which is provided on a case;
a current collector which is electrically connected with the terminal; and
a sealing member disposed between the terminal and the case or between the current collector and the case,
wherein the sealing member comprises:
a first surface which faces the case; and
a second surface which is opposite to the first surface and faces the terminal or the current collector,
wherein a first protrusion is formed on the first surface, the first protrusion surrounding a shaft portion of the terminal,
wherein a second protrusion is formed on the second surface, the second protrusion surrounding the shaft portion of the terminal,
wherein the first and second protrusions are disposed in a state where the sealing member is compressed between the terminal and the case or between the current collector and the case, and
wherein, in a state before compression, in a stacking direction of the sealing member on the case and the current collector, a protrusion amount of the first protrusion is different from a protrusion amount of the second protrusion.

12. A method of manufacturing an energy storage device, the method comprising:
arranging the sealing member according to claim 1 between the terminal and the case or between the current collector and the case; and
compressing the first and second protrusions by the terminal and the case or by the current collector and the case.

13. The sealing member according to claim 1, wherein the scaling member is disposed between the terminal and the case.

14. The sealing member according to claim 13, wherein the second surface faces the terminal.

15. The sealing member according to claim 1, wherein the sealing member is disposed between the current collector and the case.

16. The sealing member according to claim 15, wherein the second surface faces the current collector.

17. The energy storage device according to claim 11, wherein the sealing member is disposed between the terminal and the case.

18. The energy storage device according to claim 17, wherein the second surface faces the terminal.

19. The energy storage device according to claim 11, wherein the sealing member is disposed between the current collector and the case.

20. The energy storage device according to claim 19, wherein the second surface faces the current collector.

* * * * *